United States Patent
Cusano et al.

[15] 3,691,261
[45] Sept. 12, 1972

[54] GRAFT COPOLYMER WITH AN ALKYL ACRYLATE AND ETHYLTHIAETHYL METHARYLATE BACKBONE

[72] Inventors: Carmen M. Cusano, Poughkeepsie; Roy I. Yamamoto; Isaac D. Rubin, both of Wappingers Falls, all of N.Y.

[73] Assignee: Texaco, Inc., New York, N.Y.

[22] Filed: March 1, 1971

[21] Appl. No.: 120,069

[52] U.S. Cl........260/881, 260/29.6 RB, 260/45.9 R, 260/45.95, 260/79.7
[51] Int. Cl..........................C08f 15/40, C08f 19/10
[58] Field of Search.......................260/881

[56] References Cited

UNITED STATES PATENTS 3,041,307   6/1962   Baer..........................260/876
3,448,173   6/1969   Ryan et al.,.................260/876

FOREIGN PATENTS OR APPLICATIONS 1,191,717   5/1970   Great Britain............260/79.7

*Primary Examiner*—Murray Tillman
*Assistant Examiner*—John Seibert
*Attorney*—Thomas H. Whaley, Carl G. Ries and Robert A. Kulason

[57] ABSTRACT

A thermoplastic terpolymer resin composition of improved resistance to ultraviolet light deterioration consisting essentially of a rubbery copolymer backbone of a $C_2$ to $C_{18}$ alkyl acrylate and a first member of ethylthioethyl methacrylate having grafted thereon a graft copolymer of acrylonitrile and styrene member, said terpolymer composed of between about 15 and 35 weight percent of said rubbery backbone and between 65 and 85 weight percent of said graft copolymer, said rubbery backbone component having a first weight ratio of said alkyl acrylate to said first member of between about 99:1 and 99:10 and said graft copolymer component having a weight ratio of said acrylonitrile to said styrene member of between about 15:85 and 30:70, said styrene member selected from the group consisting of styrene and between about 1:0 and 1:1 weight mixture of styrene to α-methylstyrene, said terpolymer composition formed by the method consisting essentially of first polymerizing a mixture of said alkyl acrylate and said member under aqueous emulsion polymerization conditions in the presence of polymerization initiator, polymerization modifier and first anionic emulsifier to form an aqueous latex containing a copolymer of acrylate and said member, said first polymerization being conducted at a pH between about 2 and 7 at a first temperature between about 110° and 150° F. under conditions of vigorous agitation thereby forming the rubbery copolymer of alkyl acrylate and first member, then second polymerizing under aqueous emulsion conditions said formed alkyl acrylate-first member copolymer with a mixture of acrylonitrile and styrene member in the presence of polymerization initiator, polymerization modifier and a second anionic emulsifier, said second polymerization being conducted at a pH of between 2 and 7 at a second temperature between about 110° and 150° F. under vigorous agitation conditions until said terpolymer composition is formed.

2 Claims, No Drawings

GRAFT COPOLYMER WITH AN ALKYL ACRYLATE AND ETHYLTHIAETHYL METHARYLATE BACKBONE

BACKGROUND OF INVENTION

This invention pertains to the area of synthetic resin art relating to thermoplastic resin compositions derived from acrylonitrile, styrenes, acrylates and alkylthioalkyl methacrylate.

Graft polymers of polybutadiene, acrylonitrile and styrene are well known and widely used synthetic resins. They are commonly referred to in the art as ABS thermoplastic material. Due to their excellent resistance to impact and heat deformation and high tensile strength, the graft ABS type resins are useful as plastic materials for refrigerators, shoe heels, telephones, plastic pipes, machine housing and etc. Although many of the past ABS resins were satisfactory in respect to their impact strength, tensile strength, heat deflection and elastic modulus when first exposed to outdoor weathering, i.e., ultraviolet light (UV) radiation, over long periods of ultraviolet light exposure (weathering), their impact strength undesirably suffers a sharp decrease as a result of deterioration due to prolonged UV exposure. In an effort to improve ABS resin resistance to weathering, a series of UV stabilizing additives have been incorporated in the resin and modified resin compositions; however, they were often less than satisfactory either in stabilizing and/or producing a product of sufficient impact strength. Therefore, there was a definite need in the art for a thermoplastic material of the general ABS type which has the superior properties in respect to impact strength, tensile strength and etc. coupled with substantial resistance to impact strength diminution upon prolonged UV exposure.

DESCRIPTION OF INVENTION

We have discovered and this constitutes our invention a novel thermoplastic terpolymer resin compound of a $C_2$ to $C_{18}$ alkyl acrylate- ethylthioethyl methacrylate rubbery copolymer backbone having grafted thereto copolymer(s) of acrylonitrile and styrene or acrylonitrile and between about a 1:0 and 1:1 weight ratio of styrene and α-methylstyrene having not only superior resistance in respect to impact strength, tensile strength and heat deformation but also outstandingly resistant to impact deterioration even after long exposure to ultraviolet light irradiation. The superior properties of the novel terpolymer resin appear to be due partly to the particular combination of the monomers in the terpolymer and partly to the method of manufacture.

Specifically, we have discovered a thermoplastic terpolymer resin composition consisting of a rubbery copolymer backbone of $C_2$ to $C_{18}$ alkyl acrylate and a first member of ethylthioethyl methacrylate having thereon a graft copolymer(s) of acrylonitrile and a styrene member selected from the group consisting of styrene and between about 1:0 and 1:1 weight mixture of styrene and α-methylstyrene. The rubbery backbone copolymer comprises between about 15 and 35 weight percent and the graft copolymer comprises between about 65 and 85 weight percent of the terpolymer composition. Within the rubbery backbone itself the alkyl acrylate component to first member weight ratio is between about 90:10 and 99:1 and in said graft the acrylonitrile to styrene member weight ratio is between about 15:85 and 30:70.

The thermoplastic terpolymer resins contemplated herein normally have an Izod Impact strength of between about 5 and 11 ft.lb./inch notch at 73° F. (ASTM D-256) with loss of Izod Impact strength after 228 hours of UV exposure in Weather-Ometer testing (ASTM E-42) of about 5 to 40 percent. Further, the contemplated compositions normally have a tensile strength (ASTM D-638, Procedure A) of between about 3,900 and 6,000 psi, a heat deflection temperature (ASTM D-648) of between about 77° and 95° C., and an elastic modulus of between about 220 and 290 $\times 10^3$ psi (ASTM D-638).

The Izod and heat deflection values listed hereinbefore and hereinafter are based on compression molded 5×⅛×½ inch bar samples.

The thermoplastic terpolymer resins contemplated herein are produced in a two-stage anionic aqueous emulsion polymerization procedure which is outlined as follows:

In the first stage, water, polymerization initiator and anionic emulsifier, alkyl acrylate and ethylthioethyl methacrylate are charged to an oxygen free reactor and the pH of the resultant mixture is adjusted to between about 2 and 7. Normally, the water content ranges between about 50 and 80 weight percent of the polymerization mixture and the total alkyl acrylate and first member monomer content is between about 20 and 50 weight percent. The reaction temperature is adjusted to between about 110° and 150° F. and the mixture is vigorously agitated until an emulsion is formed whereupon the agitation is advantageously reduced to between about one-fifth and one-twentieth of the original rate but continued in a sufficient extent to insure less than about a ± 5° F. temperature variation during the reaction mixture. Advantageously, the polymerization is conducted in an inert atmosphere. A reactor pressure of between about 15 and 50 psig is advantageously maintained throughout the first stage polymerization. The polymerization is continued until cross-linked rubbery copolymer of alkyl acrylate and first member is formed being characterized by a conversion of 85–100 percent basis starting components. The rubbery copolymer is highly branched being insoluble in such solvents as methyl ethyl ketone and toluene. The period of polymerization in the first stage is advantageously between about 1 and 5 hours. The weight ratio of alkyl acrylate to first member employed in said polymerization is normally between about 90:10 and 99:1. Examples of the alkyl acrylate monomer reactant contemplated herein are ethyl acrylate, butyl acrylate and octyl acrylate, dodecyl acrylate and octadecyl acrylate.

The rubbery copolymer intermediate crude latex product is worked up by standard means such as adding a chain stopper to the crude latex and then filtering the reaction mixture to remove any coagulum. The coagulum is discarded and the filtrate, normally of a heavy cream-type consistency, is passed on to the second stage of the polymerization procedure.

In the second stage polymerization, the alkyl acrylate-first member rubbery copolymer filtrate from the first stage is charged to a reactor advantageously oxygen free together with anionic emulsifier, polymerization initiator and modifier, acrylonitrile and styrene member monomers, and additional water, if necessary, to obtain a desired aqueous solution which is normally between about 45 and 75 weight percent water. The pH is adjusted to between about 2 and 7. The weight ratio of rubber copolymer to acrylonitrile-styrene member employed in the second polymerization is advantageously between about 15:85 and 35:65. The contents of the reactor are vigorously agitated and adjusted to a temperature of between about 110° and 150° F. and advantageously a pressure of between about 15 and 50 psig. The high rate of agitation is continued until an emulsion is formed and then the agitation is reduced to between about one-twentieth and one-seventh of the previous rate sufficient to insure less than about ± 5° F. temperature variations throughout the polymerization mixture. The reaction is continued under reduced agitation conditions, e.g., between about one-twentieth and one-seventh of the original rate until the aforedescribed terpolymer resin composition is formed which normally is between about 1.5 and 24 hours.

The terpolymer resin composition is recovered from the reaction mixture by standard means such as coagulating the emulsion by addition into methanol and filtering. The recovered coagulated solids are washed and dried and then sent on for milling and molding for use.

As heretofore stated the characterization of the novel terpolymer resin is determined in part by its monomer components and quantities thereof. A further important factor characterizing the terpolymer resin is method of preparation. It is theorized the reason for this is the resin in actuality is a complex mixture of many specific compounds which may be broadly characterized as an alkyl acrylate-ethylthioethyl methacrylate rubbery backbone having grafted thereon one or more acrylonitrile-styrene member copolymer grafts. The molecular weight of the individual terpolymer compounds in the overall resin mixture ranges between about 100 and 500,000.

One of the more important process features is the employment of an overall emulsion polymerization technique as opposed to a mass suspension technique. When mass suspension technique is employed with all conditions and ingredients otherwise the same, the impact strength of the final polymer product is undesirably substantially lower than when the emulsion polymerization procedure is employed. Another method factor in characterizing the product is the maintenance of the reaction temperature in the desired range throughout the entire reaction system employing sufficient agitation of the reaction mixture to insure this uniformity as well as proper ingredient contact. These two factors of temperature control and agitation appear to promote the production of a resin having a high graft polymer content which in turn appears responsible in part for the excellent impact strength and UV resistance.

Another advantageous process condition is the absence of oxygen since oxygen is undesirable in that it inhibits polymerization. The absence of oxygen is brought about by standard means such as sweeping the reaction vessel with inert gas prior to polymerization and conducting polymerizations under a blanket of inert gas.

Still further, another feature of the method is that the polymerizations should be conducted at a pH between about 2 and 7, preferably between 3 and 5, and therefore, if necessary, strong alkali is employed such as sodium hydroxide or potassium hydroxide to adjust and maintain the pH at the desired level. Polymerizations conducted below about a pH of 2 result in a reaction which is too fast and coagulation occurs. At pH above about 7 the polymerization is not significant.

The quantities of polymerization initiator employed in the first and second stages range between about 0.01 and 1 weight percent (basis monomers) depending on a particular initiator involved. Examples of the initiators contemplated herein are the water soluble polymerization initiators such as hydrogen peroxide, sodium peroxide, sodium perborate, sodium persulfate and the potassium and ammonium salts of the foregoing and other peroxy agents and water soluble compounds containing the peroxy radical (-O-O-). Normally, the water soluble polymerization initiator of potassium persulfate is preferred. In addition, organic hydroperoxides may be utilized in combination with a reducing agent such as diisopropylbenzene hydroperoxide in combination with dextrose, sodium pyrophosphate and ferrous sulfate. This latter system is commonly referred to as a redox system.

The anionic emulsifiers are employed in both polymerization stages in amounts normally between about 0.3 and 5 weight percent, the exact amount being determined by the particular reaction mixture employed. Examples of the anionic emulsifiers contemplated herein are the water soluble salts of fatty acids such as sodium and potassium salts of stearic, lauric, myristic, palmitic and oleic acids as well as the resin soap salts. Additional examples of the alkali metal salts are the alkali metal salts of sulfonated hydrocarbons such as sodium lauryl sulfonate, sodium dodecyl sulfonate and sodium dodecyl benzene sulfonate. The function of the emulsifier as denoted by the name is to maintain the reactants and products in aqueous emulsion.

The polymerization modifiers are employed in the first and second stages in amounts of between about 0.15 and 0.8 weight percent based on the particular reaction mixture employed. Among the modifiers contemplated are the alkyl mercaptans of 12 to 16 carbons such as n-dodecyl mercaptan, t-hexadecyl mercaptan, a mixture of t-$C_{12}$-$C_{16}$ alkyl mercaptan. In addition, other examples are dihydrocarbyl disulfides wherein the hydrocarbyl group is from one to 16 carbons including alkaryl, aryl, alkyl and aralkyl such as dibutyl disulfide, diphenyl disulfide and dibenzyl disulfide. The modifiers function to regulate the molecular weight of the product.

The chain stoppers employed function to terminate polymerization by eliminating the free radicals present and are normally incorporated in the final mixture in amounts of the order of about 0.1 weight percent and at the end of the reaction period. Examples of the chain stoppers contemplated herein are sodium dimethyl dicarbamate, sodium diethyl dithiocarbamate, sodium dithionite, hydroquinone, phenyl hydrazine and sodium sulfide.

To the intermediate or final resin product of the invention there may be added standard additives such as antioxidants and stabilizers, e.g., ditertiary butyl-p- cresol and phenyl-beta naphthylamine and tris(nonylphenyl) phosphite. These stabilizers are generally incorporated in the final resin of between about 0.4 and 1 weight percent, preferably before recovery of the resin from the final emulsion.

The following example further illustrates the invention but is not to be construed as limitations thereof.

EXAMPLE I

This example illustrates species of the thermoplastic resin of the invention and the method of preparation.

The polymerization recipe for Stage I of the preparation method, i.e., preparation of the rubbery copolymer of alkyl acrylate and said first member is presented below:

STAGE I

Polymerization Recipe

| Ingredients | Amount Grams Run A | Run B |
|---|---|---|
| Ethylthioethyl methacrylate | 7 | 0 |
| Vinylidene chloride | 0 | 50 |
| Ethyl Acrylate | 93 | 950 |
| Potassium Persulfate | 0.25 | 2.5 |
| Sodium Bisulfite | 0.08 | 0.80 |
| Sodium Lauryl Sulfate Aq. Sol., 1:2 sulfate to $H_2O$ | 5 | 50 |
| Water | 200 | 2000 |

In the procedure of the first stage the persulfate was dissolved in water and added to a stainless steel reactor together with sodium bisulfite and sodium lauryl sulfate. The mixture was stirred at 150 rpm and purged with nitrogen. To the mixture there was added ethyl acrylate and ethylthioethyl methacrylate (Run A) vinyl-idene chloride (Run B). The contents of the reactor were stirred at a rate of 1,500 rpm for 5 minutes. The stirring rate was then reduced to 250 rpm and heat applied and temperature increased to 144° F. The reactor was kept at 144 ± 5° F. for 1.5 hours. The entire polymerization reaction was conducted under a blanket of nitrogen. The product was recovered as a latex. The yield of latex product for Run A was 100 grams (100 percent glassware) and the yield of latex product for Run B was 2,943 grams (84 percent autoclave). The rubbery copolymer products were determined to be very highly branched basis solubility data which demonstrated they swelled but did not dissolve in methyl ethyl ketone and toluene. Further analysis of the first stage products are reported below in Table II:

TABLE II

| Component | Run A, wt.% | Run B, wt.% |
|---|---|---|
| Ethylthioethyl Methacrylate | 7 | 5 |
| Ethyl Acrylate | 93 | — |
| Vinylidene Chloride | — | 95 |

STAGE II POLYMERIZATION

The ethyl acrylate-ethylthioethyl methacrylate and ethyl acrylate-vinylidene chloride copolymer latexes prepared in Stage I were then introduced into the polymerization procedure of Stage II. The polymerization recipe for Stage II is set forth below:

STAGE II

Polymerization Recipe

| Ingredient | Grams Run AA | Run BB |
|---|---|---|
| Latex of Run A | 80 | 0 |
| Latex of Run B | 0 | 639 |
| Potassium Persulfate | 0.15 | 0.8 |
| Sodium Bisulfite | 0.05 | 0.26 |
| Antioxidant* | 1.1 ml. | 8.8 ml. |
| Sodium Alkylaryl Sulfonate (20 g./liter $H_2O$) | 100 ml. | 800 ml. |
| Styrene | 50 | 400 |
| Acrylonitrile | 25 | 200 |
| t-Hexadecyl Mercaptan | 0.3 | 2.4 |
| Sodium Hydroxide Solution, 5 g./100 ml. $H_2O$ | 3.0 ml. | 24 ml. |
| Rinse Water | 54 ml. | 788 ml. |

*1/1.5/0.5 wt. ratio of tri(mixed mono and di-nonylphenyl) phosphite, hindered phenol, di-tri-decyl thiodipropionate.

In the Stage II polymerization, the potassium persulfate and sodium bisulfite were dissolved in a sodium alkylaryl sulfonate soap solution. To the resultant solution, sodium hydroxide, t-hexadecyl mercaptan, styrene and acrylonitrile monomers were added and the mixture was well shaken and charged together with the remaining soap solution and water into a stainless steel reactor. The reactor was sealed and purged with nitrogen. The contents of the reactor were stirred at 250 rpm for two hours at 65° C. At the end of this period antioxidant was then stirred in the reactor and the reactor was emptied under nitrogen pressure. Portions of the resultant latex of the terpolymer composition were coagulated by pouring into methanol and the coagulated resin was filtered, dried and the portions were submitted for testing. Analysis of the terpolymer compositions found the yield of terpolymer was essentially quantitative and the component analysis approximated the charge ratios.

The resin product compositions resulting from Runs AA and BB were further tested as to mechanical and UV resistance properties together with commercially sold comparative compositions XX (acrylonitrile-butadiene-styrene graft terpolymer) and YY (acrylonitrile-butyl acrylate-styrene graft terpolymer). The results are reported below in Tables IIIA and IIIB:

TABLE IIIA

Mechanical Properties of Terpolymer Resin Product

| Run Product | Izod Impact ft.lb./in notch | Heat Defl. Temp. °C. | E.Mod. × 10³ psi | Tensile Strength psi Yield | Break |
|---|---|---|---|---|---|
| AA | 11 | 80.2 | 293 | 6000 | 5600 |
| BB | 7.2 | 77 | 220 | 3900 | 3900 |
| YY | 1.3 | 80 | 240 | 5000 | — |
| XX | 7.7 | 78 | 220 | 4400 | — |

TABLE IIIB

Izod Impact Strength at 73°F. versus UV Exposure (Weather-Ometer Test)

Izod After Hours UV Exposure

| Run Product | 0 | 38 | 100 | 228 | % Izod Retained After 228 Hours |
|---|---|---|---|---|---|

| | | | | | |
|---|---|---|---|---|---|
| AA | 11 | 9.3 | 8.1 | 7.1 | 65 |
| AA-1[a] | 9.2 | 9.1 | 9.4 | 6.8 | 73 |
| BB | 7.2 | 5.8 | 6.2 | 6.5 | 90 |
| BB-1[a] | 6.5 | — | 6.8 | 6.1 | 94 |
| XX | 7.7 | 5.2 | 4.2 | 3.9 | 51 |
| XX-1[a] | 7.3 | 5.7 | 4.3 | 4.0 | 55 |
| XX-2[b] | 7.4 | 5.6 | 4.6 | 4.1 | 55 |
| YY | 1.3 | 1 | 1.0 | 0.70 | 54 | a. Containing 1.0 wt. % UV inhibitor (2-hydroxy-4-methoxybenzophenone)
b. Containing 1.0 wt. % UV inhibitor 2(2'hydroxy-5'-methylphenyl) benzotriazole

We claim

1. A thermoplastic terpolymer resin composition composed of a rubbery backbone first copolymer of $C_2$ to $C_{18}$ alkyl acrylate and ethylthioethyl methacrylate having grafted thereon a second copolymer of acrylonitrile and styrene member, said first copolymer to said second copolymer being present in a weight ratio of between about 15:85 and 35:65, said styrene member selected from the group consisting of styrene and between about 1:0 and 1:1 weight ratio of styrene-α-methylstyrene mixture, said alkyl acrylate and said ethylthioethyl methacrylate being in said backbone in a weight ratio between about 90:10 and 99:1, said acrylonitrile and styrene member being present in said second copolymer in a weight ratio of between about 15:85 and 30:70, said resin being prepared by first contacting under aqueous emulsion polymerization conditions said alkyl acrylate with said ethylthioethyl methacrylate using a weight of alkyl acrylate to said ethylthioethyl methacrylate of between about 90:10 and 99:1 in the presence of water, polymerization initiator, polymerization modifier and a first anionic emulsifier to form an aqueous latex containing said first copolymer, said first polymerization being conducted at a pH between about 2 and 7 and at a temperature between about 110° and 150° F. in the absence of oxygen and under conditions of vigorous agitation sufficient to form an emulsion and sufficient to limit the reaction temperature variation throughout the reaction mixture to less than ± 5° F., then second polymerizing under aqueous emulsion polymerization conditions, said formed first copolymer with a mixture of acrylonitrile and styrene member in the presence of water, polymerization initiator, polymerization modifier and a second anionic emulsifier, said second polymerization being conducted at a pH between about 2 and 7 at a temperature between about 110° and 150° F. in the absence of oxygen under vigorous agitation conditions and sufficient agitation to maintain the temperature with a range throughout the reaction mixture to less than ± 5° F., said second polymerization conducted utilizing a weight ratio of said first copolymer to the combined weight of acrylonitrile and styrene member of between about 15:85 and 35:65 and a weight ratio of said acrylonitrile to styrene member of between about 15:85 and 30:70, said styrene member as heretofore defined.

2. A composition according to claim 1 wherein said alkyl acrylate is ethyl acrylate.

* * * * *